(12) United States Patent
Apul et al.

(10) Patent No.: US 10,590,020 B2
(45) Date of Patent: Mar. 17, 2020

(54) ADDITIVE-AMPLIFIED MICROWAVE PRETREATMENT OF WASTEWATER SLUDGE

(71) Applicants: Onur Apul, Lowell, MA (US); Paul Dahlen, Tempe, AZ (US); Paul K. Westerhoff, Scottsdale, AZ (US)

(72) Inventors: Onur Apul, Lowell, MA (US); Paul Dahlen, Tempe, AZ (US); Paul K. Westerhoff, Scottsdale, AZ (US)

(73) Assignees: Arizona Board of Regents on behalf of Arizona State University, Scottsdale, AZ (US); The University of Massachusetts, Boston, MA (US)

( * ) Notice: Subject to any disclaimer, the term of this patent is extended or adjusted under 35 U.S.C. 154(b) by 0 days.

(21) Appl. No.: 16/252,261

(22) Filed: Jan. 18, 2019

(65) Prior Publication Data

US 2019/0218128 A1      Jul. 18, 2019

Related U.S. Application Data

(60) Provisional application No. 62/619,094, filed on Jan. 18, 2018.

(51) Int. Cl.
| | |
|---|---|
| *C02F 11/18* | (2006.01) |
| *C02F 11/04* | (2006.01) |
| *C02F 11/14* | (2019.01) |
| *C02F 11/13* | (2019.01) |

(Continued)

(52) U.S. Cl.
CPC ............ *C02F 11/185* (2013.01); *C02F 11/04* (2013.01); *C02F 11/131* (2019.01); *C02F 11/143* (2019.01); *C02F 11/18* (2013.01); *C02F 2303/04* (2013.01); *C02F 2305/00* (2013.01); *C02F 2305/08* (2013.01)

(58) Field of Classification Search
CPC ....... C02F 11/185; C02F 11/143; C02F 11/18; C02F 11/131; C02F 11/04; C02F 2305/08; C02F 2303/04; C02F 2305/00
USPC ............................ 210/603, 631, 748.07, 259
See application file for complete search history.

(56) References Cited

U.S. PATENT DOCUMENTS

| | | |
|---|---|---|
| 4,631,380 A | 12/1986 | Tran |
| 5,449,889 A | 9/1995 | Samardzija |
| 5,968,400 A | 10/1999 | Wicks |

(Continued)

FOREIGN PATENT DOCUMENTS

| | | |
|---|---|---|
| WO | WO2007133807 | 11/2007 |
| WO | WO2008005509 | 1/2008 |

(Continued)

OTHER PUBLICATIONS

"Effect of Ultrasonic, Microwave and Combined Microwave—Ultrasonic Pretreatment of Municipal Sludge on Anaerobic Digester Performance" Yeneneh et al., Water, Air &Soil Pollution, May 2013.*

(Continued)

*Primary Examiner* — Fred Prince
(74) *Attorney, Agent, or Firm* — Fish & Richardson P.C.

(57) ABSTRACT

Wastewater sludge is treated by combining the sludge with a carbon-based dielectric additive that includes carbon to yield a modified sludge, irradiating the modified sludge with microwave radiation to yield a treated sludge, and providing the treated sludge to an anaerobic digester.

20 Claims, 6 Drawing Sheets

(51) Int. Cl.
*C02F 11/143* (2019.01)
*C02F 11/131* (2019.01)

(56) References Cited

U.S. PATENT DOCUMENTS

| | | | |
|---|---|---|---|
| 6,857,998 B1 | 2/2005 | Slattery | |
| 7,963,720 B2 | 6/2011 | Hoag et al. | |
| 9,878,320 B2 | 1/2018 | Hristovski et al. | |
| 2012/0111800 A1* | 5/2012 | Collins | C02F 9/00 |
| | | | 210/748.07 |
| 2013/0161255 A1* | 6/2013 | Neculaes | C02F 11/12 |
| | | | 210/632 |
| 2014/0079592 A1 | 3/2014 | Chang et al. | |
| 2017/0197858 A1* | 7/2017 | Pardo | C02F 11/18 |
| 2018/0085800 A1 | 3/2018 | Westerhoff | |

FOREIGN PATENT DOCUMENTS

| | | |
|---|---|---|
| WO | WO2012109768 | 8/2012 |
| WO | WO2012155269 | 11/2012 |
| WO | WO2012162840 | 12/2012 |
| WO | WO2013188979 | 12/2013 |
| WO | WO2015147939 | 10/2015 |
| WO | WO2017035669 | 3/2017 |
| WO | WO2018073782 | 4/2018 |

OTHER PUBLICATIONS

A.G. Delgado et al., Successful operation of continuous reactors at short retention times results in high density, fast-rate Dehalococcoides dechlorinating cultures, 98 Appl. Microbiol. Biotechnol. 2729-37 (2014).

Abramovitch, R. et al., "In situ remediation of soils contaminated with toxic metal ions using microwave energy", Chemosphere, Dec. 2003, vol. 53, No. 9, pp. 1077-1085 <DOI:10.1016/S0045-6535(03)00572-1>.

Achugasim, O. et al., "Potassium permanganate as an oxidant in the remediation of soils polluted by Bonny light crude oil", Journal of Soil Science and Environmental Management, Feb. 2014, vol. 3, No. 2, pp. 4-19.

Adams, C. et al., "Effects of ozonation on the biodegradability of substituted phenols", Water Research, Oct. 1997, vol. 31, No. 10, pp. 2655-2663 <DOI:10.1016/S0043-1354(97)00114-0>.

Adebusoye, S. et al., "Microbial degradation of petroleum hydrocarbons in a polluted tropical stream", World Journal of Microbiology and Biotechnology, Aug. 2007, vol. 23, No. 8, pp. 1149-1159 <DOI:10.1007/s11274-007-9345-3>.

Adeniyi, A. et al., "Determination of total petroleum hydrocarbons and heavy metals in soils within the vicinity of facilities handling refined petroleum products in Lagos metropolis", Environment International, Apr. 2002, vol. 28, No. 1-2, pp. 79-82 <DOI:10.1016/S0160-4120(02)00007-7>.

Aeppli, C. et al., "Recalcitrance and degradation of petroleum biomarkers upon abiotic and biotic natural weathering of Deepwater Horizon oil", Environmental Science & Technology, May 2014, vol. 48, No. 12, pp. 6726-6734 <DOI:10.1021/es500825q>.

Agency for Toxic Substances and Disease Registry (ATSDR)., "2011 ATSDR Substance Priority List", U.S. Department of Health & Human Services, 2011 [retrieved on Apr. 30, 2019 from atsdr.cdc.gov], retrieved from the internet: <URL:https://www.atsdr.cdc.gov/spl/resources/2011_atsdr_substance_priority_list.html>.

Aguirre, "Breakthrough Invention Will Increase Biogas Fuel Production From Wastewater Sludge" Engineering Solutions, 2018, 2 pages.

Ahn, Y. et al., "Monitoring of petroleum hydrocarbon degradative potential of indigenous microorganisms in ozonated soil", Biodegradation, Feb. 2005, vol. 16, No. 1, pp. 45-56 <DOI: 10.1007/s10531-004-0428-2>.

Ai, Z. et al., "Microwave-induced Catalytic Oxidation of RhB by a Nanocomposite of Fe@Fe2O3 Core-Shell Nanowires and Carbon Nanotubes", The Journal of Physical Chemistry, Jun. 2008, vol. 112, No. 26, pp. 9847-9853 <DOI:10.1021/jp801950r>.

Alinnor, I. et al., "Determination of total petroleum hydrocarbon in soil and groundwater samples in some communities in Rivers State, Nigeria", Journal of Environmental Chemistry and Ecotoxicology, Dec. 2013, vol. 5, No. 11, pp. 292-297 <DOI:10.5897/JECE2013.0298>.

Apicella, B. et al., "Aromatic structures of carbonaceous materials and soot inferred by spectroscopic analysis", Carbon, 2004, vol. 42, No. 8-9, pp. 1583-1589 <DOI:10.1016/j.carbon.2004.02.010>.

Apul et al., "Ultrasonic pretreatment and subsequent anaerobic digestion under different operational conditions" Bioresource Technology 101, 2010, pp. 8984-8992.

Apul, O. et al., "Carbonaceous nano-additives augment microwave-enabled thermal remediation of soils containing petroleum hydrocarbons", Environmental Science: Nano, Aug. 2016, vol. 3, pp. 997-1002 <DOI:10.1039/ C6EN00261G>.

Apul, O. et al., "Treatment of Heavy, Long-Chain Petroleum-Hydrocarbon Impacted Soils Using Chemical Oxidation", Journal of Environmental Engineering, Dec. 2016, vol. 142, No. 12, article 04016065, 8 pages <DOI:10.1061/ (ASCE)EE.1943-7870.0001139>.

Aziz, C. et al., "Bioaugmentation Considerations", in: Stroo, H. et al (ed.) "Bioaugmentation for Groundwater Remediation" (New York, Springer, Jul. 2012), pp. 141-169.

Balgis, R. et al., "Synthesis and evaluation of straight and bead-free nanofibers for improved aerosol filtration", Chemical Engineering Science, Dec. 2015, vol. 137, pp. 947-954 <DOI:10.1016/j.ces.2015.07.038>.

Batchelor, G., "The stress system in a suspension of force-free particles", Journal of Fluid Mechanics, Apr. 1970, vol. 41, No. 3, pp. 545-570 <DOI:10.1017/S0022112070000745>.

Bavel, B., "Comparison of Fenton's Reagent and Ozone Oxidation of Polycyclic Aromatic Hydrocarbons in Aged Contaminated Soils (7 pp)", Journal of Soils and Sediments, Oct. 2006, vol. 6, No. 4, pp. 208-214 <DOI:10.1065/ jss2006.08.179>.

Bento, F. et al., "Comparative bioremediation of soils contaminated with diesel oil by natural attenuation, biostimulation and bioaugmentation", Bioresource Technology, Jun. 2005, vol. 96, No. 9, pp. 1049-1055 <DOI:10.1016/j.biortech.2004.09.008>.

Berggren, D. et al., "Effects of Sulfate Reduction on the Bacterial Community and Kinetic Parameters of a Dechlorinating Culture under Chemostat Growth Conditions", Environmental Science & Technology, Jan. 2013, vol. 47, No. 4, pp. 1879-1886 <DOI:10.1021/es304244z>.

Bijan, L. et al., "Integrated ozone and biotreatment of pulp mill effluent and changes in biodegradability and molecular weight distribution of organic compounds", Water Research, Oct. 2005, vol. 39, No. 16, pp. 3763-3772 <DOI:10.1016/j.watres.2005.07.018>.

Bojes, H. et al., "Characterization of EPA's 16 priority pollutant polycyclic aromatic hydrocarbons (PAHs) in tank bottom solids and associated contaminated soils at oil exploration and production sites in Texas", Regulatory Toxicology and Pharmacology, Apr. 2007, vol. 47, No. 3, pp. 288-295 <DOI:10.1016/j.yrtph.2006.11.007>.

Brame, J. et al.,"Photocatalytic pre-treatment with food-grade TiO2 increases the bioavailability and bioremediation potential of weathered oil from the Deepwater Horizon oil spill in the Gulf of Mexico", Chemosphere, Feb. 2013, vol. 90, No. 8, pp. 2315-2319 <DOI:10.1016/j.chemosphere.2012.10.009>.

Camel, V. et al., "The use of ozone and associated oxidation processes in drinking water treatment", Water Research, Nov. 1998, vol. 32, No. 11, pp. 3208-3222 <DOI:10.1016/S0043-1354(98)00130-4>.

Caporaso, J. et al., "QIIME allows analysis of highthroughput community sequencing data", Nature Methods, May 2010, vol. 7, No. 5, pp. 335-336 <DOI:10.1038/nmeth.f.303>.

Caporaso, J. et al., "Ultra-high-throughput microbial community analysis on the Illumina HiSeq and MiSeq platforms", The IMSE Journal, Mar. 2012, vol. 6, No. 8, pp. 1621-1624 <DOI:10.1038/ismej.2012.8>.

Carr, C. et al., "Effect of Dechlorinating Bacteria on the Longevity and Composition of PCE-Containing Nonaqueous Phase Liquids

(56) References Cited

OTHER PUBLICATIONS under Equilibrium Dissolution Conditions", Environmental Science & Technology, Feb. 2000, vol. 34, No. 6, pp. 1088-1094 <DOI:10.1021/es990989t>.

Caruso, R. et al., "Multilayered Titania, Silica, and Laponite Nanoparticle Coatings on Polystyrene Colloidal Templates and Resulting Inorganic Hollow Spheres", Chemistry of Materials, Jan. 2001, vol. 13, No. 2, pp. 400-409 <DOI:10.1021/cm001175a>.

Casper, C. et al., "Controlling Surface Morphology of Electrospun Polystyrene Fibers: Effect of Humidity and Molecular Weight in the Electrospinning Process", Macromolecules, 2004 (available online: Dec. 2003), vol. 37, No. 2, pp. 573-578 <DOI:10.1021/ma0351975>.

Chambon, J. et al., "Review of reactive kinetic models describing reductive dechlorination of chlorinated ethenes in soil and groundwater", Biotechnology and Bioengineering, Jan. 2013, vol. 110, No. 1, pp. 1-23 <DOI:10.1002/ bit.24714>.

Chang, H. et al., "Treatment of heavy oil contaminated sand by microwave energy", Environmental Engineering Science, Dec. 2011, vol. 28, No. 12, pp. 869-873 <DOI:10.1089/ees.2010.0328>.

Chen, J. et al., "Microwave-induced carbon nanotubes catalytic degradation of organic pollutants in aqueous solution", Journal of Hazardous Materials, Jun. 2016, vol. 310, pp. 226-234 <DOI:10.1016/j.jhazmat.2016.02.049>.

Chen, T. et al., "Ozone enhances biodegradability of heavy hydrocarbons in soil", Journal of Environmental Engineering and Science, Mar. 2016, vol. 11, No. 1, pp. 7-17 <DOI:10.1680/jenes.16.00002>.

Cheng, D. et al., "Isolation and characterization of "*Dehalococcoides*" sp strain MB, which dechlorinates tetrachloroethene to trans-1,2-dichloroethene", Applied and Environmental Microbiology, Sep. 2009, vol. 75, No. 18, pp. 5910-5918 <DOI:10.1128/AEM.00767-09>.

Cheng, M. et al., "Hydroxyl radicals based advanced oxidation processes (AOPs) for remediation of soils contaminated with organic compounds: A review", Chemical Engineering Journal, Jan. 2016, vol. 284, pp. 582-598 <DOI:10.1016/j.cej.2015.09.001>.

Chien, H. et al., "Clean up of petroleum-hydrocarbon contaminated soils using enhanced bioremediation system: Laboratory feasibility study", Journal of Environmental Engineering, Jun. 2010, vol. 136, No. 6, pp. 597-606 <DOI:10.1061/ ASCEEE.1943-7870.0000166>.

Chien, Y-C., "Field study of in situ remediation of petroleum hydrocarbon contaminated soil on site using microwave energy", Journal of Hazardous Materials, Jan. 2012, vol. 199-200, pp. 457-461 <DOI:10.1016/j. jhazmat.2011.11.012>.

Choi, H. et al., "Transport characteristics of gas phase ozone in unsaturated porous media for in-situ chemical oxidation", Journal of Contaminant Hydrology, Jul. 2002, vol. 57, No. 1-2, pp. 81-98<DOI:10.1016/S0169-7722(01) 00219-4>.

Cristescu, L. et al., "Evaluation of petroleum contaminants in soil by fluorescence spectroscopy", Environmental Engineering and Management Journal, Sep./Oct. 2009, vol. 8, No. 5, pp. 1269-1273 <DOI:10.30638/ eemj.2009.186>.

Das, N. et al., "Microbial degradation of petroleum hydrocarbon contaminants: an overview", Biotechnology Research International, 2011, vol. 2011, article 941810, 13 pages <DOI:10.4061/2011/941810>.

Daugulis, A. et al., "Microbial degradation of high and low molecular weight polyaromatic hydrocarbons in a two-phase partitioning bioreactor by two strains of *Sphingomonas* sp", Biotechnology Letters, Sep. 2003, vol. 25, No. 17, pp. 1441-1444.

Deitzel, J. et al., "The effect of processing variables on the morphology of electrospun nanofibers and textiles", Polymer, Jan. 2001, vol. 42, No. 1, pp. 261-272 <DOI:10.1016/S0032-3861(00)00250-0>.

Delgado, A. et al., "Role of bicarbonate as a pH buffer and electron sink in microbial dechlorination of chloroethenes", Microbial Cell Factories, 2012, vol. 11, No. 128, 10 pages.

Delgado, A. et al., "Selective enrichment yields robust ethene-producing dechlorinating cultures from microcosms stalled at cis-dichloroethene", PLoS One, Jun. 2014, vol. 9, No. 6, article e100654, 9 pages <DOI:10.1371/journal. pone.0100654>.

Delgado, A. et al., "Successful operation of continuous reactors at short retention times results in highdensity, fast-rate Dehalococcoides dechlorinating cultures", Applied Microbiology and Biotechnology, Mar. 2014, vol. 98, No. 6, pp. 2729-2737 <DOI:10.1007/s00253-013-5263-5>.

Ding, B. et al., "Titanium dioxide nanofibers prepared by using electrospinning method", Fibers and Polymers, Jun. 2004, vol. 5, No. 2, pp. 105-109.

Divya, O. et al., "Multivariate methods on the excitation emission matrix fluorescence spectroscopic data of diesel-kerosene mixtures: A comparative study", Analytica Chimica Acta, May 2007, vol. 592, No. 1, pp. 82-90 <DOI:10.1016/j.aca.2007.03.079>.

Doshi, J. et al., "Electrospinning process and applications of electrospun fibers", Journal of Electrostatics, Aug. 1995, vol. 35, No. 2-3, pp. 151-160 <DOI:10.1016/0304-3886(95)00041-8>.

Douglas, G. et al., "Environmental stability of selected petroleum hydrocarbon source and weathering ratios", Environmental Science and Technology, Jun. 1996, vol. 30, No. 7, pp. 2332-2339 <DOI:10.1021/es950751e>.

Drzyzga, O. et al., "Coexistence of a sulphate-reducing Desulfovibrio species and the dehalorespiring Desulfitobacterium frapieri TCE1 in defined chemostat cultures grown with various combinations of sulphate and tetrachloroethene", Environmental Microbiology, Feb. 2001, vol. 3, No. 2, pp. 92-99.

Duhamel, M. et al., "Growth and Yields of Dechlorinators, Acetogens, and Methanogens during Reductive Dechlorination of Chlorinated Ethenes and Dihaloelimination of 1,2-Dichloroethane", Environmental Science & Technology, Mar. 2007, vol. 41, No. 7, pp. 2303-2310 <DOI:10.1021/es062010r>.

Dutta, P. et al., "Adsorption of arsenate and arsenite on titanium dioxide suspensions", Journal of Colloid and Interface Science, Oct. 2004, vol. 278, No. 2, pp. 270-275 <DOI:10.1016/j.jcis.2004.06.015>.

Earth Microbiome Project, "16S rRNA Amplification Protocol" [online], EMP Protocols and Standards, Mar. 2016 [retrieved Apr. 22, 2019 from web.archive.org, as it appeared on Mar. 18, 2016], retrieved from the internet: <https://web.archive.org/web/20160318004703/http://press.igsb.anl.gov/earthmicrobiome/emp-standard-protocols/16s/>.

Earth Microbiome Project, "16S Taxonomic Assignments" [online], EMP Protocols and Standards, Apr. 2016 [retrieved Apr. 22, 2019 from web.archive.org, as it appeared on Apr. 26, 2016], retrieved from the internet: <https://web.archive.org/web/20160426034936/http://press.igsb.anl.gov/earthmicrobiome/emp-standard-protocols/16s-taxonomic-assignments/>.

Earth Microbiome Project, "18S rRNA Amplification Protocol" [online], EMP Protocols and Standards, Mar. 2016 [retrieved Apr. 22, 2019 from web.archive.org, as it appeared on Mar. 18, 2016], retrieved from the internet: <https://web.archive.org/web/20160318213325/http://press.igsb.anl.gov/earthmicrobiome/emp-standard-protocols/18s/>.

Earth Microbiome Project, "DNA Extraction Protocol" [online], EMP Protocols and Standards, Apr. 2016 [retrieved Apr. 22, 2019 from web.archive.org, as it appeared on Apr. 26, 2016], retrieved from the internet: <https://web.archive.org/web/20160426140902/http://press.igsb.anl.gov/earthmicrobiome/emp-standard-protocols/dna-extraction-protocol/>.

Earth Microbiome Project, "EMP Protocols and Standards" [online], Earth Microbiome Project, May 2016 [retrieved Apr. 22, 2019 from web.archive.org, as it appeared on May 24, 2016], retrieved from the internet: <URL:https://web.archive.org/web/20160524222055/http://www.earthmicrobiome.org/emp-standard-protocols/>.

Earth Microbiome Project, "Metadata Formatting" [online], EMP Protocols and Standards, Apr. 2016 [retrieved Apr. 22, 2019 from web.archive.org, as it appeared on Apr. 26, 2016], retrieved from the internet: <https://web.archive.org/web/20160426044811/http://press.igsb.anl.gov/earthmicrobiome/emp-standard-protocols/metadata-formatting/>.

Eaton, A. et al., "5210—Biochemical Oxygen Demand (BOD)", Standard Methods for the Examination of Water and Wastewater, 2005 (21st ed.), pp. 5.2-5.13.

(56) References Cited

OTHER PUBLICATIONS

Eda, G. et al., "Flight path of electrospun polystyrene solutions: Effects of molecular weight and concentration", Materials Letters, Mar. 2007, vol. 61, No. 7, pp. 1451-1455 <DOI:10.1016/j.matlet.2006.07.052>.

Edgar, R. et al., "Search and clustering orders of magnitude faster than BLAST", Bioinformatics, Oct. 2010, vol. 26, No. 19, pp. 2460-2461 <DOI:10.1093/bioinformatics/btq461>.

Einstein, A., "On the Motion of Small Particles Suspended in Liquids at Rest Required by the Molecular-Kinetic Theory of Heat", Annalen der Physik, 1905, vol. 322, pp. 549-560.

Ellis, D. et al., "Bioaugmentation for accelerated in situ anaerobic bioremediation", Environmental Science & Technology, Apr. 2000, vol. 34, No. 11, pp. 2254-2260 <DOI:10.1021/es990638e>.

Essien, O. et al., "Impact of crude-oil spillage pollution and chemical remediation on agricultural soil properties and crop growth", Journal of Applied Sciences and Environmental Management, Dec. 2010, vol. 14, No. 4, pp. 147-154 <DOI:10.4314/jasem.v14i4.63304>.

Falciglia, et al., "An Overview on Microwave Heating Application for Hydrocarboncontaminated Soil and Groundwater Remediation", Oil and Gas Research, 2016, vol. 2, No. 1, article 10000110, 6 pages <DOI:10.4172/2472-0518.1000110>.

Falciglia, P. et al., "Microwave heating remediation of soils contaminated with diesel fuel", Journal of Soil and Sediments, Sep. 2013, vol. 13, No. 8, pp. 1396-1407 <DOI:10.1007/s11368-013-0727-x>.

Falciglia, P. et al., "Remediation of hydrocarbon polluted soils using 2.45 GHz frequencyheating: Influence of operating power and soil texture on soil temperature profiles and contaminant removal kinetics", Journal of Geochemical Exploration, Apr. 2015, vol. 151, pp. 66-73 <DOI:10.1016/j.gexplo.2015.01.007>.

Fong, H. et al., "Beaded nanofibers formed during electrospinning", Polymer, Jul. 1999, vol. 40, No. 16, pp. 4585-4592 <DOI:10.1016/S0032-3861(99)00068-3>.

Gates, D. et al., "In-situ chemical oxidation of trichloroethylene using hydrogen peroxide", Journal of Environmental Engineering, Sep. 1995, vol. 121, No. 9, pp. 639-644 <DOI:10.1061/(ASCE)0733-9372(1995)121:9(639)>.

Goi, A. et al., "Combined chemical and biological treatment of oil contaminated soil", Chemosphere, Jun. 2006, vol. 63, No. 10, pp. 1754-1763 <DOI:10.1016/j.chemosphere.2005.09.023>.

Goi, A. et al., "Ozonation and Fenton treatment for remediation of diesel fuel contaminated soil", Ozone: Science & Engineering, Aug. 2006, vol. 28, No. 1, pp. 37-46 <DOI:10.1080/01919510500479130>.

Haapea, P. et al., "Integrated treatment of PAH contaminated soil by soil washing, ozonation and biological treatment", Journal of Hazardous Materials, Aug. 2006, vol. 136, No. 2, pp. 244-250 <DOI:10.1016/j.jhazmat.2005.12.033>.

Herzfelder, E., "Method for the determination of extractable petroleum hydrocarbons (EPH)", Massachusetts Department of Environmental Protection (MADEP), May 2004, vol. 39, 60 pages.

Hoof, F. et al., "Formation of oxidation by products in surface water preozonation and their behaviour in water treatment", Water Supply, 1986, vol. 4, No. 3, pp. 93-102.

Hoogesteij Von Reitzenstein, N. et al., "Morphology, structure, and properties of metal oxide/polymer nanocomposite electrospun mats", Journal of Applied Polymer Science, Sep. 2016, vol. 133, No. 33, article 43811, 9 pages <DOI:10.1002/APP.43811>.

Horiba Scientific., "Aqualog Software: User's Guide for version 3.6" [online], Horiba Scientific, Jun. 2012 [retrieved on Apr. 30, 2019 from horiba.com], retrieved from the internet: <URL:http://www.horiba.com/fileadmin/uploads/Scientific/Downloads/UserArea/Fluorescence/Manuals/AquaLog-User-Guide.pdf>.

Horiba Scientific., "Aqualog Version 3.6.10.1: Release Notes" [online], Horiba Scientific, Dec. 2014 [retrieved on Apr. 30, 2019 from horiba.com], retrieved from the internet: <URL:http://www.horiba.com/fileadmin/uploads/Scientific/Downloads/Software/Aqualog_Release_Notes.pdf>.

Hoskisson, P., "Continuous culture—making a comeback?", Microbiology, Oct. 2005, vol. 151, Pt. 10, pp. 3153-3159 <DOI:10.1099/mic.0.27924-0>.

Howe, K. et al., "Advanced Oxidation", in: Crittenden, J. et al., "MWH's Water Treatment : Principles and Design" (Hoboken, NJ, John Wiley & Sons, Inc. 2012), pp. 1415-1484.

Howe, K. et al., "Disinfection/Oxidation By-products", in: Crittenden, J. et al., "MWH's Water Treatment : Principles and Design" (Hoboken, NJ, John Wiley & Sons, Inc. 2012), pp. 1485-1527.

Huang, Z-M. et al., "A review on polymer nanofibers by electrospinning and their applications in nanocomposites", Composites Science and Technology, 2003, vol. 63, pp. 2223-2253 <Doi:10.1016/S0266-3538(03)00178-7>.

Irin, F. et al., "Detection of carbon nanotubes in biological samples through microwave-induced heating", Carbon, Oct. 2012, vol. 50, No. 12, pp. 4441-4449 <DOI:10.1016/j.carbon.2012.05.022>.

Jamieson, D. et al., "Coordinated surface activities in Variovorax paradoxus EPS", BMC Microbiology, Jun. 2009, vol. 9, No. 1, pp. 124-141 <DOI:10.1186/1471-2180-9-124>.

Javorská, H. et al., "Effect of ozonation on polychlorinated biphenyl degradation and on soil physico-chemical properties", Journal of Hazardous Materials, Jan. 2009, vol. 161, No. 2-3, pp. 1202-1207 <DOI:10.1016/j. jhazmat 2008.04.071>.

Jiang, Y. et al., "Engineered Crumpled Graphene Oxide Nanocomposite Membrane Assemblies for Advanced Water Treatment Processes", Environmental Science & Technology, May 2015, vol. 49, No. 11, pp. 6846-6854 <DOI:10.1021/acs.est.5b00904>.

Jiang, Y. et al., "Facile Aerosol Synthesis and Characterization of Ternary Crumpled Graphene-TiO2-Magnetite Nanocomposites for Advanced Water Treatment", ACS Applied Materials & Interfaces, Jul. 2014, vol. 6, No. 14, pp. 11766-11774 <DOI:10.1021/am5025275>.

Jones, D. et al., "Experimental evaluation of methods to quantify dissolved organic nitrogen (DON) and dissolved organic carbon (DOC) in soil", Soil Biology and Biochemistry, May 2006, vol. 38, No. 5, pp. 991-999 <DOI:10.1016/j. soilbio.2005.08.012>.

Jones, D. et al., "Microwave heating applications in environmental engineering—a review", Resources, Conservation and Recycling, Jan. 2002, vol. 34, No. 2, pp. 75-90 <DOI:10.1016/S0921-3449(01)00088-X>.

Jones, D. et al., "The recognition of biodegraded petroleum-derived aromatic hydrocarbons in recent marine sediments", Mar. 1983, vol. 14, No. 3, pp. 103-108 <DOI:10.1016/0025-326X(83)90310-7>.

Jordan, J. et al., "Experimental trends in polymer nanocomposites—a review", Materials Science and Engineering: A, Feb. 2005, vol. 393, No. 1-2, pp. 1-11 <DOI:10.1016/j.msea.2004.09.044>.

Jou, C-J. et al., "Application of microwave energy to treat granular activated carbon content with chlorobenzene" Environmental Progress & Sustainable Energy, Oct. 2010, vol. 29, No. 3, pp. 272-277 <DOI:10.1002/ep>.

Jung, H. et al., "Effects of in situ ozonation on structural change of soil organic matter", Environmental Engineering Science, 2003, vol. 20, No. 4, pp. 289-299 <DOI:10.1089/109287503322148564>.

Jung, H. et al., "Effects of in-situ ozonation on indigenous microorganisms in diesel contaminated soil: survival and regrowth", Chemosphere, Nov. 2005, vol. 61, No. 7, pp. 923-932 <DOI:10.1016/j.chemosphere.2005.03.038>.

Kang, G. et al., "Remediation of polycyclic aromatic hydrocarbons in soil using hemoglobin-catalytic mechanism", Journal of Environmental Engineering, Oct. 2015, vol. 141, No. 10, article 04015025, 5 pages <DOI:10.1061/ (ASCE)EE.1943-7870.0000955>.

Karpenko, O. et al., "Chemical oxidants for remediation of contaminated soil and water. A review", Chemistry & Chemical Technology, 2009, vol. 3, No. 1, pp. 41-45.

Kawala, Z. et al., "Microwave-Enhanced Thermal Decontamination of Soil", Environmental Science & Technology, Jul. 1998, vol. 32, No. 17, pp. 2602-2607 <DOI:10.1021/es980025m>.

Keen, O. et al., "Enhanced biodegradation of carbamazepine after UV/H2O2 advanced oxidation", Environmental Science & Technology, Apr. 2012, vol. 46, No. 11, pp. 6222-6227 <DOI:10.1021/es300897u>.

(56) References Cited

OTHER PUBLICATIONS

Khan, F. et al., "An overview and analysis of site remediation technologies", Journal of Environmental Management, Jun. 2004, vol. 71, No. 2, pp. 95-122 <DOI:10.1016/j.jenvman.2004.02.003>.

Khare, H. et al., "A quantitative method for measuring nanocomposite dispersion", Polymer, Feb. 2010, vol. 51, No. 3, pp. 719-729 <DOI:10.1016/j.polymer.2009.12.031>.

Kim, B. et al., "Enhanced humification of soil organic matter by microwave irradiation and hyperthermal catalysts", Advanced Materials Research, Dec. 2014, vol. 1073-1076, pp. 696-699 <DOI:10.4028/www.scientific.net/ AMR.1073-1076.696>.

Kim, H. et al., "Nutrient acquisition and limitation for the photoautotrophic growth of *Synechocystis* sp. PCC6803 as a renewable biomass source", Biotechnology and Bioengineering, Feb. 2011, vol. 108, No. 2, pp. 277-285 <DOI:10.1002/bit.22928>.

Kim, J. et al., "Modeling in situ ozonation for the remediation of nonvolatile PAH-contaminated unsaturated soils", Journal of Contaminant Hydrology, Apr. 2002, vol. 55, No. 3-4, pp. 261-285 <DOI:10.1016/S0169-7722(01)00196-6>.

Kim, T. et al., "Microwave heating of carbonbased solid materials", Carbon Letters, Jan. 2014, vol. 15, No. 1, pp. 15-24 <DOI:10.5714/CL.2014.15.1.015>.

Krajmalnik-Brown, R. et al., "Genetic Identification of a Putative Vinyl Chloride Reductase in *Dehalococcoides* sp. Strain BAV1", Applied and Environmental Microbiology, Oct. 2004, vol. 70, No. 10, pp. 6347-6351 <DOI:10.1128/AEM.70.10.6347-6351.2004>.

Kulik, N. et al., "Degradation of polycyclic aromatic hydrocarbons by combined chemical pre-oxidation and bioremediation in creosote contaminated soil", Journal of Environmental Management, Mar. 2006, vol. 78, No. 4, pp. 382-391 <DOI:10.1016/j.jenvman 2005.05.005>.

Leach, M. et al., "Electrospinning Fundamentals: Optimizing Solution and Apparatus Parameters", Journal of Visualized Experiments, Jan. 2011, vol. 47, article e2494, 4 pages <DOI:10.3791/2494>.

Lee, B-T. et al., "Ozonation of diesel fuel in unsaturated porous media", Applied Geochemistry, Aug. 2002, vol. 17, No. 8, pp. 1165-1170 <DOI:10.1016/S0883-2927(02)00011-2>.

Lee, K. et al., "The change of bead morphology formed on electrospun polystyrene fibers", Polymer, Jun. 2003, vol. 44, No. 14, pp. 4029-4034 <DOI:10.1016/S0032-3861(03)00345-8>.

Lee, Y. et al., "Oxidative transformation of micropollutants during municipal wastewater treatment: Comparison of kinetic aspects of selective (chlorine, chlorine dioxide, ferrateVI, and ozone) and non-selective oxidants (hydroxyl radical)", Water Research, Jan. 2010, vol. 44, No. 2, pp. 555-566 <DOI:10.1016/j.watres.2009.11.045>.

Lehtola, M. et al., "Microbially available organic carbon, phosphorus, and microbial growth in ozonated drinking water", Water Research, May 2001, vol. 35, No. 7, pp. 1635-1640 <DOI:10.1016/S0043-1354(00)00449-8>.

Li, D. et al., "Electrospinning of Nanofibers: Reinventing the Wheel?", Advanced Materials, 2004, vol. 16, No. 14, pp. 1151-1170 <DOI:10.1002/adma.200400719>.

Li, D. et al., "Fabrication of Titania Nanofibers by Electrospinning", Nanoletters, Mar. 2003, vol. 3, No. 4, pp. 555-560 <DOI:10.1021/nl034039o>.

Li, D. et al., "Microwave thermal remediation of crude oil contaminated soil enhanced by carbon fiber", Journal of Environmental Sciences, 2009, vol. 21, pp. 1290-1295 <DOI:10.1016/S1001-0742(08)62417-1>.

Li, G. et al., "Degradation of Reactive Dyes in a Photocatalytic Circulating-Bed Biofilm Reactor", Biotechnology and Bioengineering, Apr. 2012 (available online Nov. 2011), vol. 109, No. 4, pp. 884-893 <DOI:10.1002/bit.24366>.

Li, S. et al., "Determination of multi-walled carbon nanotube bioaccumulation in earthworms measured by a microwavebased detection technique", Science of the Total Environment, Feb. 2013, vol. 445-446, pp. 9-13 <DOI:10.1016/j.scitotenv.2012.12.037>.

Li, Y. et al., "Fabrication of polyaniline/titanium dioxide composite nanofibers for gas sensing application", Materials Chemistry and Physics, Sep. 2011, vol. 129, No. 1-2, pp. 477-482 <DOI:10.1016/j.matchemphys.2011.04.045>.

Liang, Y. et al., "Microarray-based functional gene analysis of soil microbial communities during ozonation and biodegradation of crude oil", Chemosphere, Apr. 2009, vol. 75, No. 2, pp. 193-199 <DOI:10.1016/j. chemosphere.2008.12.007>.

Liu, X. et al., "Combined effect of microwave and activated carbon on the remediation of polychlorinated biphenyl-contaminated soil", Chemosphere, Apr. 2006, vol. 63, No. 2, pp. 228-235 <DOI:10.1016/j.chemosphere.2005.08.030>.

Löffler, F. et al., "*Dehalococcoides mccartyi* gen. nov., sp. nov., obligately organohalide-respiring anaerobic bacteria relevant to halogen cycling and bioremediation, belong to a novel bacterial class, *Dehalococcoidia classis* nov., order *Dehalococcoidales* ord. nov. and family *Dehalococcoidaceae* fam. nov., within the phylum Chloroflexi", International Journal of Systematic and Evolutionary Microbiology, Feb. 2013, vol. 63, Pt. 2, pp. 625-635 <DOI:10.1099/ijs.0.034926-0>.

Lu, M. et al., "Remediation of petroleum-contaminated soil after composting by sequential treatment with Fenton-like oxidation and biodegradation", Bioresource Technology, Apr. 2010, vol. 101, No. 7, pp. 2106-2113 <DOI:10.1016/j. biortech.2009.11.002>.

Mackay, M. et al., "Nanoscale effects leading to non-Einstein-like decrease in viscosity", Nature Materials, Nov. 2003, vol. 2, No. 11, pp. 762-766 <DOI:10.1038/nmat999>.

Madani, M. et al., "PS/TiO2 (Polystyrene/Titanium Dioxide) Composite Nanofibers With Higher Surface-to-Volume Ratio Prepared by Electrospinning: Morphology and Thermal Properties", Polymer Engineering and Science, 2013, vol. 53, pp. 2407-2412 <DOI:10.1002/pen.23493>.

Magnuson, J. et al., "Reductive Dechlorination of Tetrachloroethene to Ethene by a Two-Component Enzyme Pathway", Applied and Environmental Microbiology, Apr. 1998, vol. 64, No. 4, pp. 1270-1275.

Mangal, R. et al., "Phase stability and dynamics of entangled polymer-nanoparticle composites", Nature Communications, Jun. 2015, vol. 6, No. 7198, pp. 1-9 <DOI:10.1038/ncomms8198>.

Matijević, E. et al., "Ferric hydrous oxide sols: III. Preparation of uniform particles by hydrolysis of Fe(III)-chloride, -nitrate, and -perchlorate solutions", Journal of Colloid and Interface Science, Mar. 1978, vol. 63, No. 3, pp. 509-524 <DOI:10.1016/S0021-9797(78)80011-3>.

Mazinani, S. et al., "Morphology, structure and properties of conductive PS/CNT nanocomposite electrospun mat", Polymer, Jul. 2009, vol. 50, No. 14, pp. 3329-3342 <DOI:10.1016/j.polymer.2009.04.070>.

Mckenna, E. et al., "Evaluation of the total petroleum hydrocarbon (TPH) standard for JP-4 jet fuel", Journal of Soil Contamination, 1995 (available online Dec. 2008), vol. 4, No. 4, pp. 355-406 <DOI:10.1080/15320389509383505>.

Mcmillen, S. et al., "Application of risk-based decision-making for international exploration and production site management", Risk-based decision-making for assessing petroleum impacts at exploration and production sites, Dept. of Energy and the Petroleum Environmental Research Forum (Tulsa, OK), Oct. 2001, pp. 187-197.

Medeiros, E. et al., "Effect of Relative Humidity on the Morphology of Electrospun Polymer Fibers", Canadian Journal of Chemistry, 2008, vol. 86, pp. 590-599 <DOI:10.1139/V08-029>.

Mehnert, C. et al., "Heterogeneous Heck Catalysis with Palladium-Grafted Molecular Sieves", Journal of the American Chemical Society, Nov. 1998, vol. 120, No. 47, pp. 12289-12296 <DOI:10.1021/ja971637u>.

Menéndez, J. et al., "Microwave heating processes involving carbon materials", Fuel Processing Technology, Jan. 2010, vol. 91, No. 1, pp. 1-8 <DOI:10.1016/j.fuproc.2009.08.021>.

Mercer, J. et al., "A review of immiscible fluids in the subsurface: properties, models, characterization and remediation", Journal of Contaminant Hydrology, Sep. 1990, vol. 6, No. 2, pp. 107-163 <DOI:10.1016/0169-7722(90)90043-G>.

(56) References Cited

OTHER PUBLICATIONS

Mohan, S. et al., "Bioremediation technologies for treatment of PAH-contaminated soil and strategies to enhance process efficiency", Reviews in Environmental Science and Bio/Technology, Nov. 2006, vol. 5, No. 4, pp. 347-374 <DOI:10.1007/s11157-006-0004-1>.

Moran, M. et al., "Chlorinated solvents in groundwater of the United States", Environmental Science & Technology, 2007 (available online Dec. 2006), vol. 41, No. 1, pp. 74-81 <DOI:10.1021/es061553y>.

Müller, J. et al., "Molecular Identification of the Catabolic Vinyl Chloride Reductase from *Dehalococcoides* sp. Strain VS and Its Environmental Distribution", Applied and Environmental Microbiology, Aug. 2004, vol. 70, No. 8, pp. 4880-4888 <DOI:10.1128/AEM.70.8.4880-4888.2004>.

Munter, R., "Advanced oxidation processes-current status and prospects", Proceedings of the Estonian Academy of Sciences, 2001, vol. 50, No. 2, pp. 59-80.

Mutyala, S. et al., "Microwave applications to oil sands and petroleum: A review", Fuel Processing Technology, Feb. 2010, vol. 91, No. 2, pp. 127-135 <DOI:10.1016/j.fuproc.2009.09.009>.

Naidu, R., "Recent Advances in Contaminated Site Remediation", Water, Air & Soil Pollution, Dec. 2013, vol. 224, Article 1705, 11 pages <DOI:10.1007/s11270-013-1705-z>.

Neta, P. et al., "Rate constants for reactions of inorganic radicals in aqueous solution", Journal of Physical and Chemical Reference Data, 1988, vol. 17, No. 3, pp. 1027-1284 <DOI:10.1063/1.555808>.

Nocentini, M. et al., "Bioremediation of a soil contaminated by hydrocarbon mixtures: the residual concentration problem", Chemosphere, Oct. 2000, vol. 41, No. 8, pp. 1115-1123 <DOI:10.1016/S0045-6535(00)00057-6>.

O.G. Apul et. al, Treatment of heavy, long-chain petroleum-hydrocarbon impacted soils using chemical oxidation, 142 J. Environ. Eng. 12 (2016), 04016065-1-04016065-8.

Ojha, S. et al., "Morphology of Electrospun Nylon-6 Nanofibers as a Function of Molecular Weight and Processing Parameters", Journal of Applied Polymer Science, 2008, vol. 108, pp. 308-319 <DOI:10.1002/app.27655>.

O'Mahony, M. et al., "The use of ozone in the remediation of polyaromatic hydrocarbon contaminated soil", Chemosphere, Apr. 2006, vol. 63, No. 2, pp. 307-314 <DOI:10.1016/j.chemosphere.2005.07.018>.

Pai, C-L. et al., "Morphology of Porous and Wrinkled Fibers of Polystyrene Electrospun from Dimethylformamide", Macromolecules, Feb. 2009, vol. 42, No. 6, pp. 2102-2114 <DOI:10.1021/ma802529h>.

Palmer, G. et al., "Elemental analysis of lake sediment from Sudbury, Canada, using particle-induced X-ray emission", Science of the Total Environment, Nov. 1989, vol. 87-88, pp. 141-156 <DOI:10.1016/0048-9697(89) 90231-3>.

Park, J-S. et al., "Kinetic decomposition of ozone and para-chlorobenzoic acid (pCBA) during catalytic ozonation", Water Research, May 2004, vol. 38, No. 9, pp. 2285-2292 <DOI:10.1016/j.watres.2004.01.040>.

Paslawski, J. et al., "Biodegradation kinetics of trans-4-methyl-1-cyclohexane carboxylic acid", Biodegredation, Feb. 2009, vol. 20, No. 1, pp. 125-133 <DOI:10.1007/s10532-008-9206-2>.

Patel, A. et al., "Electrospinning of Porous Silica Nanofibers Containing Silver Nanoparticles for Catalytic Applications", Chemistry of Materials, Feb. 2007, vol. 19, No. 6, pp. 1231-1238 <DOI:10.1021/cm061331z>.

Petri, B. et al., "Fundamentals of ISCO Using Hydrogen Peroxide", in: Springer (ed.) "In Situ Chemical Oxidation for groundwater remediation" (Springer, May 2011), pp. 33-88.

Pierzynski, G., "Methods of phosphorus analysis for soils, sediments, residuals, and waters", Southern Cooperative Series Bulletin, 2000, No. 396.

Pinedo, J. et al., "Assessment of soil pollution based on total petroleum hydrocarbons and individual oil substances", Journal of Environmental Management, Nov. 2013, vol. 130, pp. 72-79 <DOI:10.1016/j.jenvman.2013.08.048>.

Popat, S. et al., "Kinetics and Inhibition of Reductive Dechlorination of Trichloroethene, cis-1,2-Dichloroethene and Vinyl Chloride in a Continuously Fed Anaerobic Biofilm Reactor", Environmental Science & Technology, Jan. 2011, vol. 45, No. 4, pp. 1569-1578 <DOI:10.1021/es102858t>.

Qiu, L. et al., "Formaldehyde biodegradation by immobilized *Methylobacterium* sp. XJLW cells in a three-phase fluidized bed reactor", Bioprocess and Biosystems Engineering, Jul. 2014, vol. 37, No. 7, pp. 1377-1384 <DOI:10.1007/s00449-013-1110-4>.

Ramakrishna, S. et al., Book Review on "An Introduction to Electrospinning and Nanofibers", Journal of Engineered Fibers and Fabrics, 2008, vol. 3, No. 2, pp. 46-47.

Ramaseshan, R. et al., "Nanostructured ceramics by electrospinning", Applied Physics Reviews, 2007, vol. 102, No. 111101, 17 pages <DOI:10.1063/1.2815499>.

Ranc, B. et al., "Selection of oxidant doses for in situ chemical oxidation of soils contaminated by polycyclic aromatic hydrocarbons (PAHs): A review", Journal of Hazardous Materials, Jul. 2016, vol. 312, pp. 280-297 <DOI:10.1016/j. jhazmat.2016.03.068>.

Rayner, J. et al., "Petroleum-hydrocarbon contamination and remediation by microbioventing at sub-Antarctic Macquarie Island", Cold Regions Science and Technology, May 2007, vol. 48, No. 2, pp. 139-153 <DOI:10.1016/j. coldregions.2006.11.001>.

Ritalahti, K. et al., "Quantitative PCR Targeting 16S rRNA and Reductive Dehalogenase Genes Simultaneously Monitors Multiple Dehalococcoides Strains", Applied and Environmental Microbiology, Apr. 2006, vol. 72, No. 4, pp. 2765-2774 <DOI:10.1128/AEM.72.4.2765-2774.2006>.

Rittmann, B. et al., "Treatment of a colored groundwater by ozone-biofiltration: pilot studies and modeling interpretation", Water Research, Jul. 2002, vol. 36, No. 13, pp. 3387-3397 <DOI:10.1016/S0043-1354(02)00033-7>.

Russo, L. et al., "Ozone oxidation and aerobic biodegradation with spent mushroom compost for detoxification and benzo(a)pyrene removal from contaminated soil", Chemosphere, May 2012, vol. 87, No. 6, pp. 595-601 <DOI:10.1016/j.chemosphere.2012.01.012>.

Sabalowsky, A. et al., "Trichloroethene and cis-1,2-dichloroethene concentration-dependent toxicity model simulates anaerobic dechlorination at high concentrations. II: continuous flow and attached growth reactors", Biotechnology and Bioengineering, Oct. 2010, vol. 107, No. 3, pp. 540-549 <DOI:10.1002/bit.22822>.

Salam, L. et al., "Biodegradation of used engine oil by a methylotrophic bacterium, Methylobacterium mesophilicum isolated from tropical hydrocarboncontaminated soil", Petroleum Science and Technology, Dec. 2014, vol. 33, No. 2, pp. 186-195 <DOI:10.1080/10916466.2014.961610>.

Santos, E. et al., "Electric-field dependence of the effective dielectric constant in graphene", Nano Letters, Jan. 2013, vol. 13, No. 3, pp. 898-902 <DOI:10.1021/nl303611v>.

Schaefer, C. et al., "Bioaugmentation for chlorinated ethenes using *Dehalococcoides* sp.: Comparison between batch and column experiments", Chemosphere, Apr. 2009, vol. 75, No. 2, pp. 141-148 <DOI:10.1016/j. chemosphere.2008.12.041>.

Schindelin, J. et al., "Fiji: an open-source platform for biological-image analysis", Nature Methods, Jul. 2012, vol. 9, No. 7, pp. 676-682 <DOI:10.1038/nmeth.2019>.

Scott, J. et al., "Integration of chemical and biological oxidation processes for water treatment: review and recommendations", Environmental Progress, 1995, vol. 14, No. 2, pp. 88-103 <DOI:10.1002/ep.670140212>.

Steffan, R. et al., "Production and Handling of Dehalococcoides Bioaugmentation Cultures", in: Stroo, H. et al (ed.) "Bioaugmentation for Groundwater Remediation" (New York, Springer, Jul. 2012), pp. 89-115.

Su, C. et al., "Photocatalytic Process of Simultaneous Desulfurization and Denitrification of Flue Gas by TiO2-Polyacrylonitrile Nanofibers", Environmental Science & Technology, Sep. 2013, vol. 47, No. 20, pp. 11562-11568 <DOI:10.1021/es4025595>.

(56) References Cited

OTHER PUBLICATIONS

Sung, Y. et al., "*Geobacter lovleyi* sp. Nov. strain SZ, a novel metal-reducing and tetrachloroethenedechlorinating bacterium", Applied and Environmental Microbiology, Apr. 2006, vol. 72, No. 4, pp. 2775-2782 <DOI:10.1128/ AEM.72.4.2775-2782.2006>.

Sutton, N. et al., "Impact of organic carbon and nutrients mobilized during chemical oxidation on subsequent bioremediation of a diesel-contaminated soil", Chemosphere, Feb. 2014, vol. 97, pp. 64-70 <DOI:10.1016/j. chemosphere.2013.11.005>.

T. Chen et. al., Ozone enhances the bioavailability of heavy hydrocarbons in soil, 11 J. Environ. Eng. Sci. 7-17 (2016).

Tai, C. et al., "Dechlorination and destruction of 2, 4, 6-trichlorophenol and pentachlorophenol using hydrogen peroxide as the oxidant catalyzed by molybdate ions under basic condition", Chemosphere, Apr. 2005, vol. 59, No. 3, pp. 321-326 <DOI:10.1016/j.chemosphere.2004.10.024>.

Tang, S. et al., "Functional characterization of reductive dehalogenases by using blue native polyacrylamide gel electrophoresis", Applied and Environmental Microbiology, Feb. 2013, vol. 79, No. 3, pp. 974-981 <DOI:10.1128/ AEM.01873-12>.

Thavasi, V. et al., "Electrospun nanofibers in energy and environmental applications", Energy & Environmental Science, 2008, vol. 1, pp. 205-221 <DOI:10.1039/B809074M>.

Tran, D. et al., "Electrospun Zeolite/Cellulose Acetate Fibers for Ion Exchange of Pb", Fibers, Dec. 2014, vol. 2, pp. 308-317 <DOI:10.3390/fib2040308>.

Tsai, T. et al., "Enhanced bioremediation of fuel-oil contaminated soils: Laboratory feasibility study", Journal of Environmental Engineering, Sep. 2009, vol. 135, No. 9, pp. 845-853 <DOI:10.1061/(ASCE) EE.1943-7870.0000049>.

Tsai, T. et al., "Treatment of fuel-oil contaminated soils by biodegradable surfactant washing followed by Fenton-like oxidation", Journal of Environmental Engineering, Oct. 2009, vol. 135, No. 10, pp. 1015-1024 <DOI:10.1061/ (ASCE)EE.1943-7870.0000052>.

Tsai, T. et al., "Treatment of petroleum-hydrocarbon contaminated soils using hydrogen peroxide oxidation catalyzed by waste basic oxygen furnace slag", Journal of Hazardous Materials, Oct. 2009, vol. 170, No. 1, pp. 466-472 <DOI:10.1016/j.jhazmat.2009.04.073>.

Tuteja, A. et al., "Multifunctional Nanocomposites with Reduced Viscosity", Macromolecules, Nov. 2007, vol. 40, No. 26, pp. 9427-9434 <DOI:10.1021/ma071313i>.

Urum, K. et al., "A comparison of the efficiency of different surfactants for removal of crude oil from contaminated sites", Chemosphere, Mar. 2006, vol. 62, No. 9, pp. 1403-1410 <DOI:10.1016/j.chemosphere.2005.05.016>.

Urum, K. et al., "Surfactants treatment of crude oil contaminated soils", Journal of Colloid and Interface Science, Aug. 2004, vol. 276, No. 2, pp. 456-464 <DOI:10.1016/j.jcis.2004.03.057>.

Usepa., "Nonhalogenated Organics Using GC/FID", United States Environmental Protection Agency, 2003, 37 pages.

Vainberg, S. et al., "Large-scale production of bacterial consortia for remediation of chlorinated solventcontaminated groundwater", Journal of Industrial Microbiology & Biotechnology, Sep. 2009, vol. 36, No. 9, pp. 1189-1197 <DOI:10.1007/s10295-009-0600-5>.

Van Aken, B. et al., Biodegradation of Nitro-Substituted Explosives 2,4,6-Trinitrotoluene, Hexahydro-1,3,5-Trinitro-1,3,5-Triazine, and Octahydro-1,3,5,7-Tetranitro-1,3,5-Tetrazocine by a Phytosymbiotic *Methylobacterium* sp. Associated with Poplar Tissues (Populus deltoides nigra DN34), Applied and Environmental Microbiology, Jan. 2004, vol. 70, No. 1, pp. 508-517 <DOI:10.1128/AEM.70.1.508-517.2004>.

Van Beilen, J. et al., "Rubredoxins Involved in Alkane Oxidation", Journal of Bacteriology, Mar. 2002, vol. 184, No. 6, pp. 1722-1732 <DOI:10.1128/JB.184.6.1722-1732.2002>.

Wang, J. et al., "Compositional Changes of Hydrocarbons of Residual Oil in Contaminated Soil During Ozonation", Ozone: Science & Engineering, Oct. 2013, vol. 35, No. 5, pp. 366-374 <DOI:10.1080/01919512.2013.796859>.

Wang, Z. et al., "Oil spill identification", Journal of Chromatography A, May 1999, vol. 843, No. 1-2, pp. 369-411 <DOI:10.1016/S0021-9673(99)00120-X>.

Weissker, U. et al., "Carbon nanotubes filled with ferromagnetic materials", Materials, Aug. 2010, vol. 3, No. 8, pp. 4387-4427 <DOI:10.3390/ma3084387>.

Wu, J. et al., "Treatment of landfill leachate by ozone-based advanced oxidation processes", Chemosphere, Feb. 2004, vol. 54, No. 7, pp. 997-1003 <DOI:10.1016/j.chemosphere.2003.10.006>.

Xu, X. et al., "Biodegradable electrospun poly(1-lactide) fibers containing antibacterial silver nanoparticles", European Polymer Journal, Sep. 2006, vol. 42, No. 9, pp. 2081-2087 <DOI:10.1016/j.eurpolymj.2006.03.032>.

Yan, J. et al., "Unexpected specificity of interspecies cobamide transfer from *Geobacter* spp. to organohalide- respiring Dehalococcoides mccartyi strains", Applied and Environmental Microbiology, Sep. 2012, vol. 78, No. 18, pp. 6630-6636 <DOI:10.1128/AEM.01535-12>.

Yang, Q. et al., "Influence of Solvents on the Formation of Ultrathin Uniform Poly(vinyl pyrrolidone) Nanofibers with Electrospinning", Journal of Polymer Science Part B, Sep. 2004, vol. 42, No. 20, pp. 3721-3726 <DOI:10.1002/ polb.20222>.

Yang, Y. et al., "Competition for Hydrogen within a Chlorinated Solvent Dehalogenating Anaerobic Mixed Culture", Environmental Science & Technology, Sep. 1998, vol. 32, No. 22, pp. 3591-3597 <DOI:10.1021/es980363n>.

Yen, C-H. et al., "Application of persulfate to remediate petroleum hydrocarboncontaminated soil: Feasibility and comparison with common oxidants", Journal of Hazardous Materials, Feb. 2011, vol. 186, No. 2-3, pp. 2097-2102 <DOI:10.1016/j.jhazmat.2010.12.129>.

Young, R. et al., "Aerobic Biodegradation of 2,2-Dithiodibenzoic Acid Produced from Dibenzothiophene Metabolites", Applied and Environmental Microbiology, Jan. 2006, vol. 72, No. 1, pp. 491-496 <DOI:10.1128/AEM.72.1.491-496.2006>.

Yu, D-Y. et al., "Characteristics in oxidative degradation by ozone for saturated hydrocarbons in soil contaminated with diesel fuel", Chemosphere, Jan. 2007, vol. 66, No. 5, pp. 799-807 <DOI:10.1016/j.chemosphere.2006.06.053>.

Yu, S. et al., "Kinetics and Inhibition of Reductive Dechlorination of Chlorinated Ethylenes by Two Different Mixed Cultures", Environmental Science & Technology, 2005 (available online Dec. 2004), vol. 39, No. 1, pp. 195-205 <DOI:10.1021/es0496773>.

Yuan, S. et al., "Microwave remediation of soil contaminated with hexachlorobenzene", Journal of Hazardous Materials, Sep. 2006, vol. B137, No. 2, pp. 878-885 <DOI:10.1016/j.jhazmat.2006.03.005>.

Zeng, Y. et al., "Integrated Chemical-Biological Treatment of Benzo[a]pyrene", Environmental Science & Technology, Feb. 2000, vol. 34, No. 5, pp. 854-862 <DOI:10.1021/es990817w>.

Zheng, D. et al., "Influence of Hydraulic Retention Time on Extent of PCE Dechlorination and Preliminary Characterization of the Enrichment Culture", Bioremediation Journal, Apr. 2001, vol. 5, No. 2, pp. 159-168 <DOI:10.1080/20018891079384>.

Zhu, M. et al., "Study on Oxidation Effect of Ozone on Petroleum-Based Pollutants in Water", Modern Applied Science, Jan. 2010, vol. 4, No. 1, pp. 6-11.

Zhu, N. et al., "Microwave Treatment of Hazardous Wastes: Remediation of Soils Contaminated by Non-Volatile Organic Chemicals Like Dioxins", Journal of Microwave Power and Electromagnetic Energy, 1992, vol. 27, No. 1, pp. 54-61 <DOI:10.1080/08327823.1992.11688171>.

Ziv-El, M. et al., "Development and characterization of DehaloR^2, a novel anaerobic microbial consortium performing rapid dechlorination of TCE to ethene", Applied Microbiology and Biotechnology, Dec. 2011, vol. 92, No. 5, pp. 1063-1071 <DOI:10.1007/s00253-011-3388-y>.

Ziv-El, M. et al., "Managing methanogens and homoacetogens to promote reductive dechlorination of trichloroethene with direct delivery of H2 in a membrane biofilm reactor", Biotechnology and Bioengineering, Sep. 2012, vol. 109, No. 9, pp. 2200-2210 <DOI:10.1002/bit.24487>.

(56) References Cited

OTHER PUBLICATIONS

Ziv-El, M. et al., "Using Electron Balances and Molecular Techniques to Assess Trichoroethene-Induced Shifts to a Dechlorinating Microbial Community", Biotechnology and Bioengineering, Sep. 2012, vol. 109, No. 9, pp. 2230-2239 <DOI:10.1002/bit.24504>.

\* cited by examiner

ADDITIVE-AMPLIFIED MICROWAVE PRETREATMENT OF WASTEWATER SLUDGE

CROSS-REFERENCE TO RELATED APPLICATION

This application claims the benefit of U.S. Provisional Patent Application 62/619,094 entitled "ADDITIVE-AMPLIFIED MICROWAVE PRETREATMENT OF WASTEWATER SLUDGE" filed on Jan. 18, 2018, which is incorporated by reference herein in its entirety.

TECHNICAL FIELD

This invention relates to additive-amplified microwave treatment of wastewater sludge to facilitate anaerobic digestion of the sludge.

BACKGROUND

Wastewater treatment is an energy demanding process. Globally, wastewater treatment facilities consume more than 30 million MWh energy every year. In addition, wastewater treatment generates large volumes of concentrated biologically active slurry as a by-product (i.e., sludge). Handling sludge is a tedious task that requires further treatment and disposal taking up to approximately 50% of the overall wastewater treatment cost requirement.

SUMMARY

Methods and systems for external decomposition of microbial cells in municipal wastewater treatment plant sludge prior to anaerobic digestion are disclosed. Methods include dielectric additive augmented microwave irradiation of the sludge prior to providing the sludge to an anaerobic digester. This pretreatment increases biogas production of wastewater treatment plant digesters, reduces costs associated with disposal of final sludge mass, and allows adjustment of influent sludge temperatures to mesophilic conditions in the anaerobic digesters.

In a general aspect, treating wastewater sludge includes combining the sludge with a carbon-based dielectric additive that includes carbon to yield a modified sludge. The modified sludge is irradiated with microwave radiation to yield a treated sludge, and the treated sludge is provided to an anaerobic digester.

Implementations of the general aspect may include one or more of the following features.

The carbon-based dielectric additive may be an inorganic material. In some cases, the carbon-based dielectric additive includes an allotrope of carbon. The carbon-based dielectric additive may be a nanomaterial. The nanomaterial may be in the form of nanoparticles, nanorods, nanosheets, or nanotubes. In some cases, the nanomaterial includes carbon fibers. The nanomaterial may include multi-walled carbon nanotubes.

In certain cases, the sludge is generated from treatment of wastewater with biological methods. The sludge typically includes 0.025 wt % to 2.5 wt % of the carbon-based dielectric additive.

The modified sludge is typically irradiated for a duration in a range of 1 second to 15 minutes. In certain cases, the irradiation of the modified sludge occurs for a duration in a range of 1 second to 100 seconds. The frequency of the microwave radiation is typically between 300 MHz and 300 GHz. In certain cases, the frequency of the microwave radiation is between 2 GHz and 3 GHz. In some cases, the frequency of the microwave radiation is 2.45 GHz. The power of the microwave radiation is typically between 500 W and 3000 W. The energy input to the modified sludge is at least 2.5 kWh per kilogram of modified sludge.

In another general aspect, a wastewater treatment system includes a wastewater treatment reservoir, a sludge treatment reservoir, and an anaerobic digester. The wastewater treatment reservoir includes sludge. The sludge treatment reservoir is operatively coupled to a microwave radiation source and is configured to receive sludge from the wastewater treatment reservoir. The anaerobic digester is configured to receive treated sludge from the sludge treatment reservoir.

Implementations of the general aspect may include one or more of the following features.

The sludge treatment reservoir may be operatively coupled to a device configured to mechanically mix contents of the sludge treatment reservoir. In certain cases, the sludge treatment reservoir is configured to receive a quantity of carbon nanomaterial. In some cases, the anaerobic digester is configured to generate biogas.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
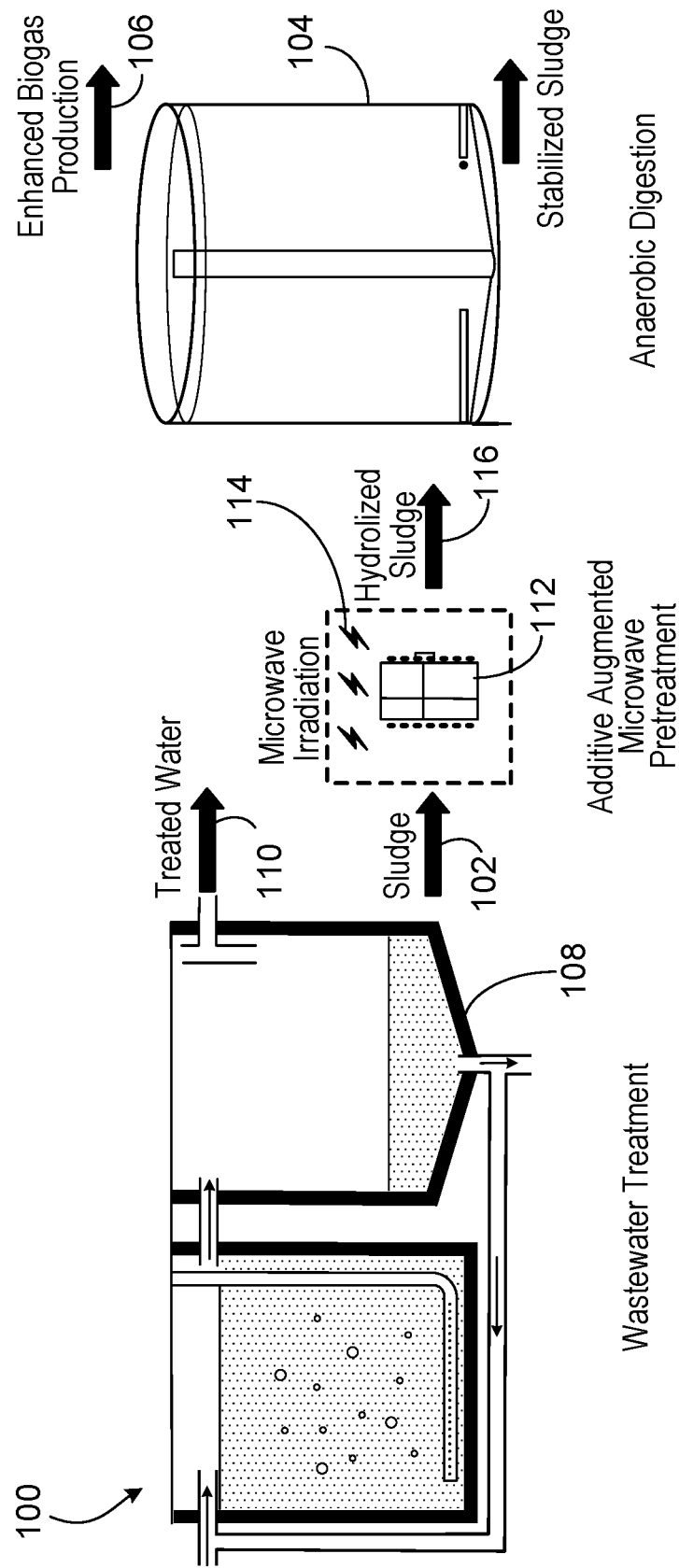
FIG. 1 depicts treatment of wastewater sludge from a wastewater treatment plant prior to anaerobic digestion.

Sludge is an organic, carbon-rich resource that can be converted into biogas via microbial conversion in a process such as anaerobic digestion. FIG. 1 depicts treatment of sludge 102 in a wastewater treatment plant 100 prior to anaerobic digestion in an anaerobic digester 104. Anaerobic digestion is the biological conversion of organic constituents to biogas 106 in the absence of free oxygen. Biogas 106, an end product, is mainly composed of methane and carbon dioxide. Biogas 106 is typically about 65 vol % methane. Biological mechanisms of anaerobic digestion include hydrolysis, acidogenesis, acetogenesis, and methanogenesis.

Among these, hydrolysis, which includes breaking complex molecules into simpler sugars and fatty acids, is typically a rate-limiting step.

In some examples, sludge 102 is generated from treatment of wastewater with biological methods. As depicted in FIG. 1, wastewater is provided to a wastewater treatment reservoir 108. Gravity separates water 110 from the sludge 102 in the wastewater treatment reservoir 108, and the water 110 is discharged from the wastewater treatment reservoir to a nearby water source, such as a river or lake.

As described herein, treatment of the sludge 102 prior to anaerobic digestion includes providing the sludge 102 to a sludge treatment reservoir 112 operatively coupled to a microwave radiation source 114, combining a carbon-based dielectric additive with the sludge 102 to yield a modified sludge, and irradiating the modified sludge using the microwave radiation source 114 to yield a treated sludge 116. Microwave-enabled heating introduces an electromagnetic field to the target matrix and generates heat by mechanisms including: (i) polar molecules (i.e., compounds with permanent and induced dipoles such as water or chlorinated organics) rotate erratically to align themselves to the incoming dielectric field, physical resistance causes friction, and subsequent heat release elevates the temperature of the molecules and their surroundings; and (ii) free electrons of charged particles (i.e., freely moving charged particles within a region such as n electrons of graphitic carbon surface) trying to couple to the changes of electric field dissipate energy in the form of heat.

Dielectric additives augment localized heating, which further enhances these processes. The heat induction, which is the ability to suppress electromagnetic radiation and convert it to thermal energy, is influenced by the dielectric properties of the additives. Dielectric properties of compounds are governed at least in part by their polarity and morphology. The selective nature of microwave heating can further be localized by utilizing dielectric additives with favorable dielectric properties. Carbonaceous nanomaterials have an exceptional electron budget on the π-orbitals and, as disclosed herein, when used as dielectric additives to augment microwave-enabled thermal treatment of sludge, show extraordinary heating performance when mixed with sludge.

The modified sludge typically contains about 0.025 wt % to about 2.5 wt % of the carbon-based dielectric additive. The microwave radiation typically has a power of about 2 kW and a duration of the irradiation can be up to 15 minutes. The microwave radiation can have a frequency in a range of 300 MHz to 300 GHz. The microwave radiation can have a power in a range of 500-3000 W. The modified sludge can be irradiated with the microwave radiation for a length of time in a range of 1 second to 900 seconds (e.g., 1 second to 100 seconds). An energy input to the modified sludge can be at least 2.5 or at least 5 kWh per kilogram of modified sludge. The irradiated modified sludge may reach a temperature up to 500° C. Additional details regarding microwave radiation of soil materials using dielectric additives is further described in US 2018/0085800 A1, which is incorporated by reference herein. The carbon-based dielectric additive may be combined with the sludge prior to microwave irradiation, during microwave irradiation, or both. This treatment may be considered a "single step" treatment. The treated sludge is provided to the anaerobic digester.

The carbon-based additive may be an inorganic carbon-based additive, such as an allotrope of carbon. In some implementations, the carbon-based dielectric additive is a nanomaterial, having at least one dimension in a range of 1 nm to 1000 nm, or 1 nm to 100 nm. Examples of suitable carbon-based dielectric additives include charcoal and activated carbon. Examples of suitable nanomaterials include single-walled and multi-walled carbon nanotubes, nanoactivated carbon, submicron activated carbon nanofibers, graphene nanosheets, and superfine powdered activated carbons having particle sizes of less than 1μm (e.g., average particle size of about 0.2 μm). The carbon-based dielectric additives may include graphene, graphene oxide, carbon nanotubes, carbon nanofibers, and superfine powdered activated carbon. Other suitable additives include metals and metal oxide nanomaterials, such as magnetite, silicon carbide, and hematite.

Microwave irradiation of the modified sludge initiates sub-micron level local heating, releasing intracellular organic contaminants by breaking cell walls and solubilizing extracellular polymeric substances. This disclosure provides evidence on the effectiveness of dielectric carbonaceous nanomaterials as additives to microwave-enabled thermal remediation and identifies advantageous properties of select carbon nanomaterials.

Figure 2:
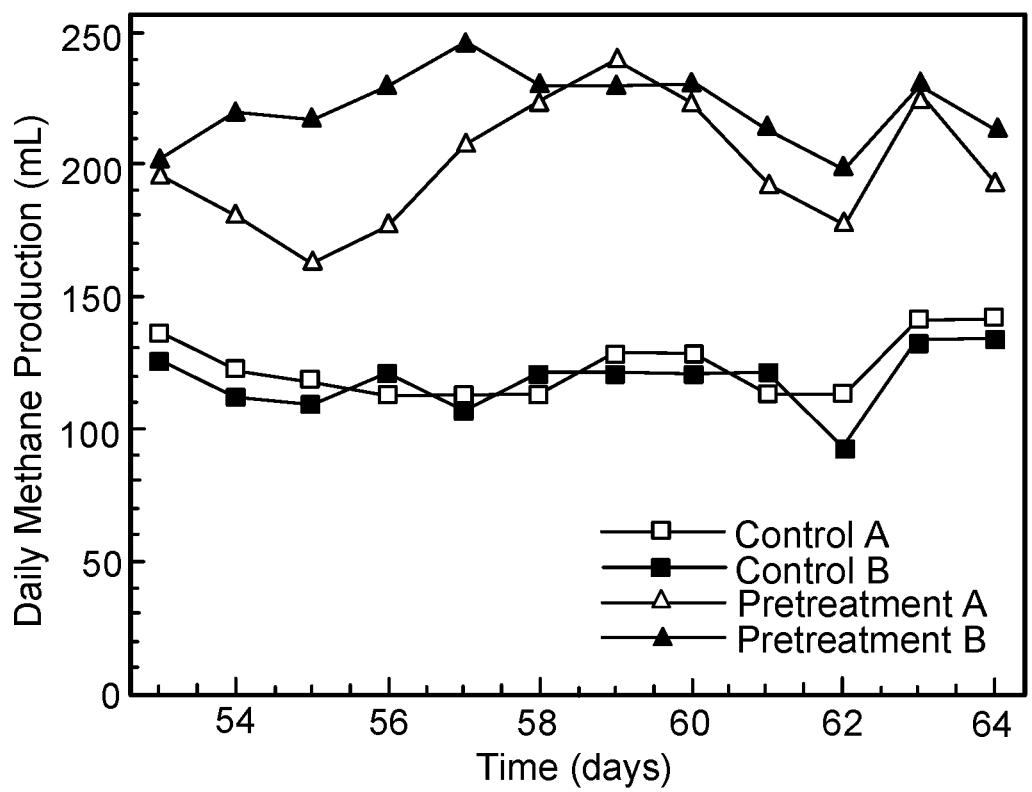
FIG. 2 shows daily methane production in fed-batch lab-scale anaerobic digester reactors for untreated control and mechanically pretreated municipal sludge.

FIG. 2 shows methane production over time from fed-batch lab-scale anaerobic digester reactors for untreated control samples of municipal sludge and samples subjected to ultrasonic radiation. Compared to the two control samples (Control A and Control B), the treated samples (Pretreatment A and Pretreatment B) showed an average increase of methane production by 74%. Ultrasonication, when applied to sludge, causes extracellular polymeric materials (EPS) and the cellular membranes of microorganisms to solubilize due at least in part to extreme local temperatures and pressures, resulting in a sharp increase in soluble chemical oxygen demand (sCOD) concentration in sludge.

Figure 3:
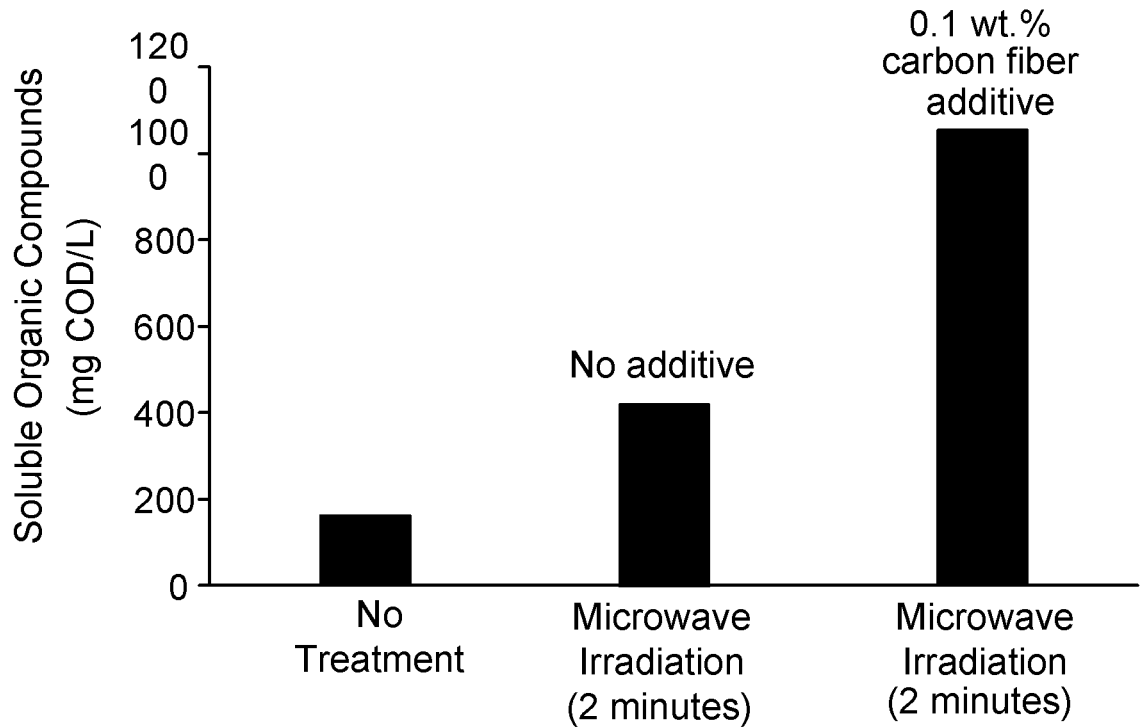
FIG. 3 the effect of carbon fiber additives and microwave radiation on the release of soluble organic matter.

FIG. 3 shows the effect of carbon-based dielectric additives and microwave heating (2.45 GHz, 1 kW power, 2 minutes) on soluble chemical oxygen demand (sCOD) concentration in sludge. 50 grams of waste activated sludge was pretreated in a 1 kW domestic (2.45 GHZ) microwave oven for 2 minutes. The sludge was filtered through 0.45 micron membranes and the liquid was analyzed by COD kits according to a method provided by Hach Company.

Microwave irradiation demonstrates an increase in soluble organic compound concentration by over 200% compared to a control sample (no microwave irradiation, no additive). Together, addition of 0.1 wt % carbon fibers to the control sample and microwave radiation demonstrates an increase in soluble organic compound concentration by over 500% compared to the control sample.

Figure 4:
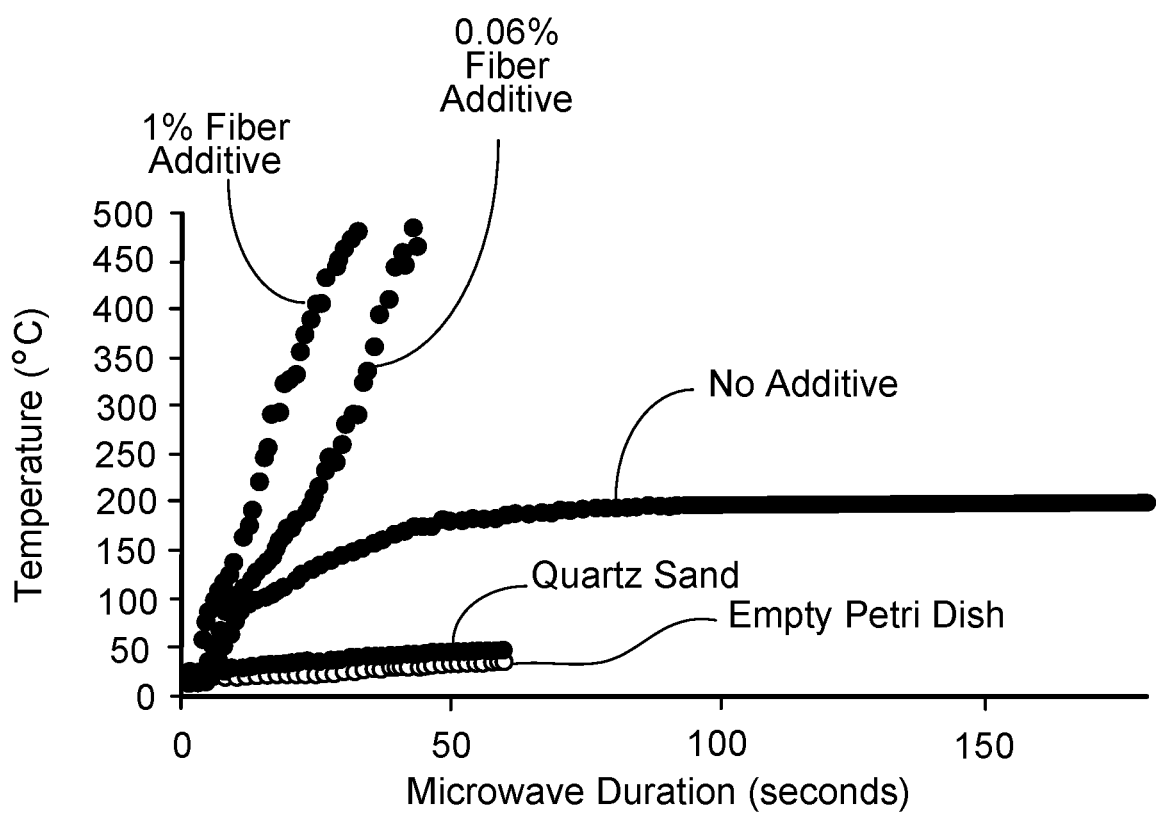
FIG. 4 shows the temperature response to microwave radiation of synthetic soil with and without additives.

FIG. 4 shows the temperature response of synthetic soil (50 grams of quartz sand and crude oil mixture with less than 5 wt % crude oil) with and without additives subjected to three minutes of microwave irradiation. Samples with added 1 wt % and 0.06 wt % carbon fiber (available from Sigma Aldrich) increased in temperature up to about 500° C. with less than 50 seconds of microwave irradiation, while the control sample (no added carbon fiber) reached a maximum temperature of about 200° C. with about 50 seconds of microwave irradiation. This temperature did not increase further with additional irradiation. Microwave irradiation of an empty Petri dish and quartz sand for about 60 seconds resulted in a maximum temperature of about 200° C.

Increasing the concentration of soluble organic carbon in wastewater sludge by additive-amplified treatment yields a treated sludge that undergoes more rapid hydrolysis and increases biogas production and methane percentage in anaerobic digestion. Additive-amplified treatment also increases possible subsequent heat and electricity production utilizing the biogas, decreases final sludge mass due at least in part to more complete conversion of organic carbon to methane, and yields more stable digested sludge due at least in part to lower moisture and organic matter content (dissolved and total organic matter content, including volatile and total suspended solid) content.

EXAMPLES

Two screening assays were standardized to select the best performing additive under microwave (MW) irradiation conditions. The first assay was performed using dry glass beads as a carrier medium in a quartz dish that was tested and found inert under microwave irradiation. Predetermined amounts of additives were blended in with glass beads and irradiated in custom 2 kW power and 2.45 GHz frequency microwave oven for up to 300 seconds. Heating profiles of all additives were compared using an infrared temperature sensor integral to the ceiling of the microwave cavity. The second assay was developed for liquid samples considering the high water content of sludge. The second assay comprised 500 mL inert quartz cylindrical containers holding around 50 mL liquid i.e., distilled and deionized (DDI) water or waste activated sludge. The DDI water was generated in-situ at 18.2 MS2/cm resistance to ensure no MW interference caused by impurities in water. Waste activated sludge was collected from Lowell Wastewater Utility (Lowell, Mass.). The sludge was kept in a refrigerator to minimize biological activity and discarded after 10 days to ensure consistent sludge quality. The heating profiles of different additives (at 1 wt %) were compared, as depicted in FIGS. 5A and 5B.

Figure 5A:
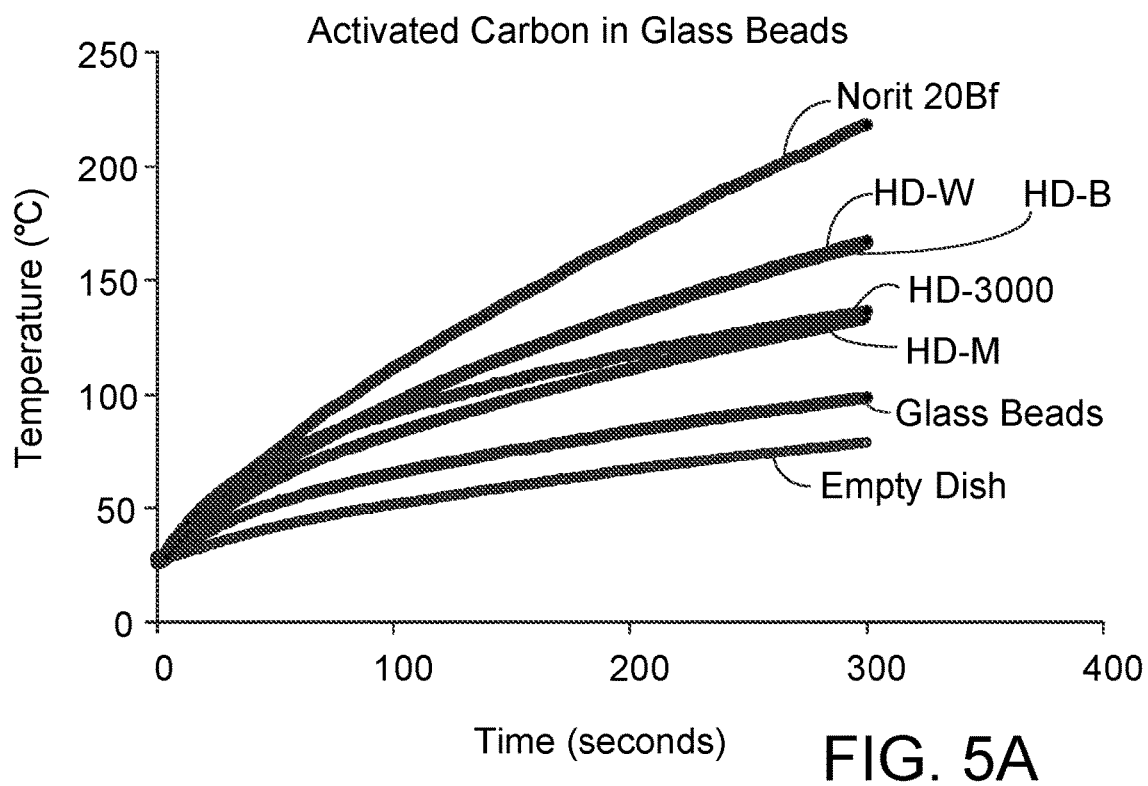
FIGS. 5A and 5B show the temperature response to microwave radiation of glass beads with and without additives.
Figure 5B:
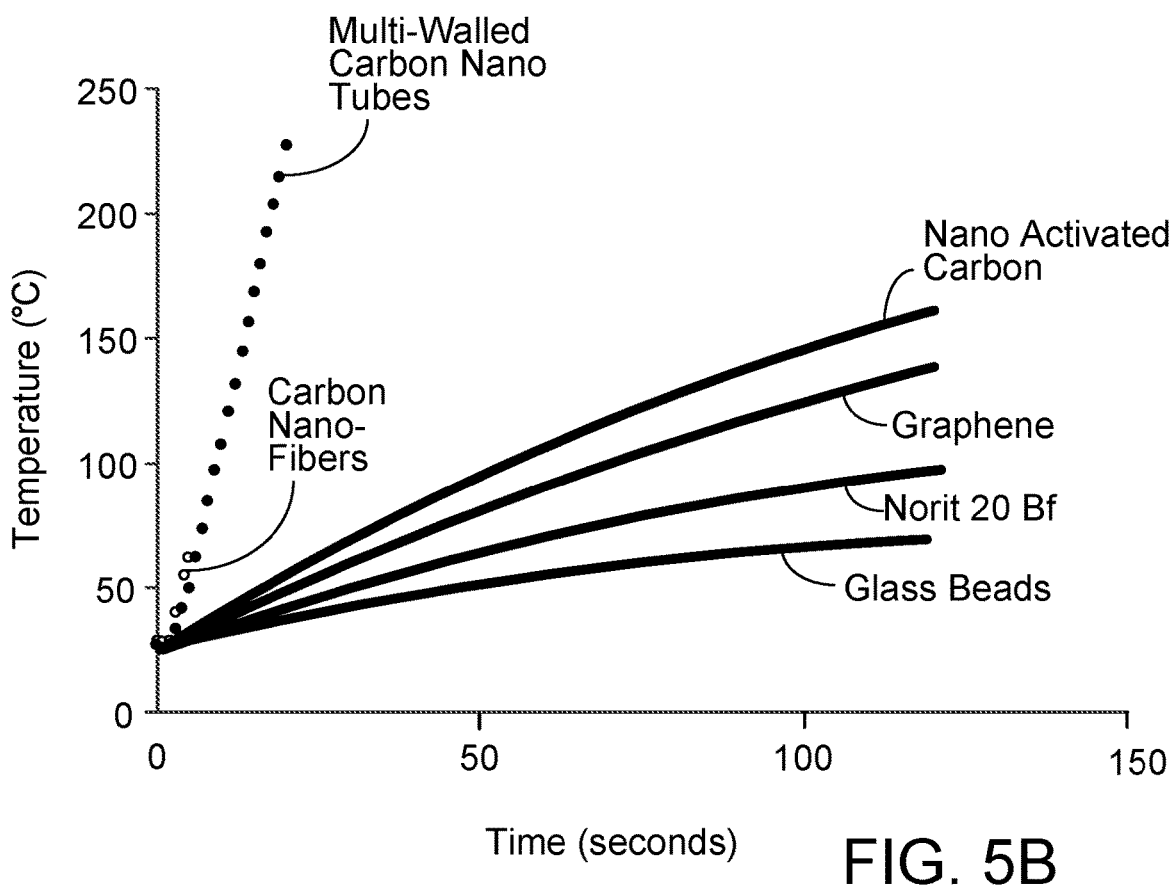

As shown in FIG. 5A, among commercially available activated carbons and magnetite, Norit 20-BF showed notably higher reactivity for microwave within 300 seconds. The final temperatures reached 220° C., which is approximately 50° C. higher than the second most reactive additive. As depicted in FIG. 5B, nano additive heating tests showed that carbon nanofibers reached 220° C. within the first 20 seconds of irradiation. The slope for multi-walled carbon nanotubes was similar to that of carbon nanofibers. However, the experiment was stopped after 5 seconds due to excessive light emissions from the sample (sparks and glowing spots). The slopes for the other additives, including nano-activated carbon and graphene, were notably lower. The nano assay was performed in smaller petri dishes (5-cm). Norit 20-BF was repeated in small petri dishes to compare the results in both bulk and nano-additive assays. The disposition of Norit 20-BF on the nano-additive affirms the exceptionally reactive nature of carbon nanofibers.

Figure 6:
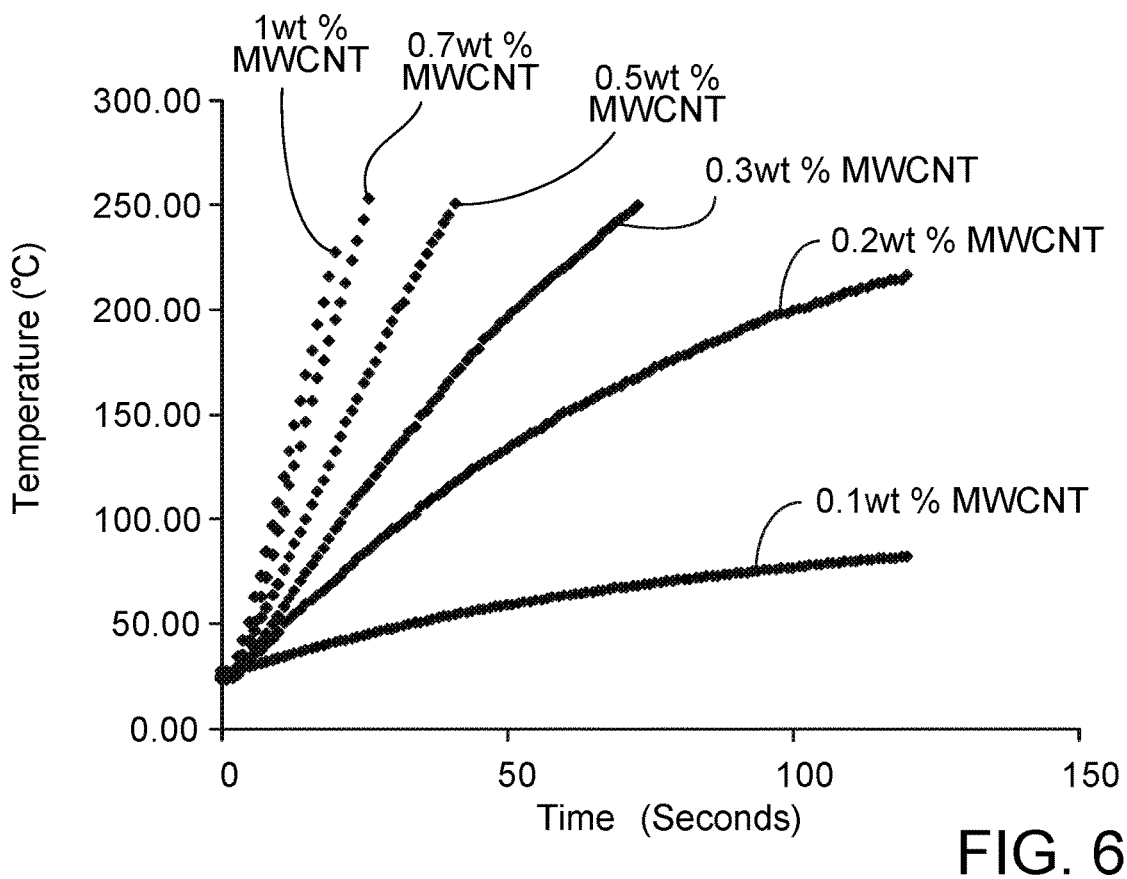
FIG. 6 shows the temperature response to microwave radiation of varying concentrations of multi-walled carbon nano additives.

Multi-walled carbon nano additives were selected to further assess lower additive amounts. The results, as depicted in FIG. 6, showed that the amount of additive plays a role in heat dissipation and may influence cost. Two iron-based additives (iron chloride salt and hematite) were also tested with no notable impact on temperature profiles of plain glass beads. According to the results, both carbon nano fibers and Norit 20BF were investigated as promising additives.

Figure 7:
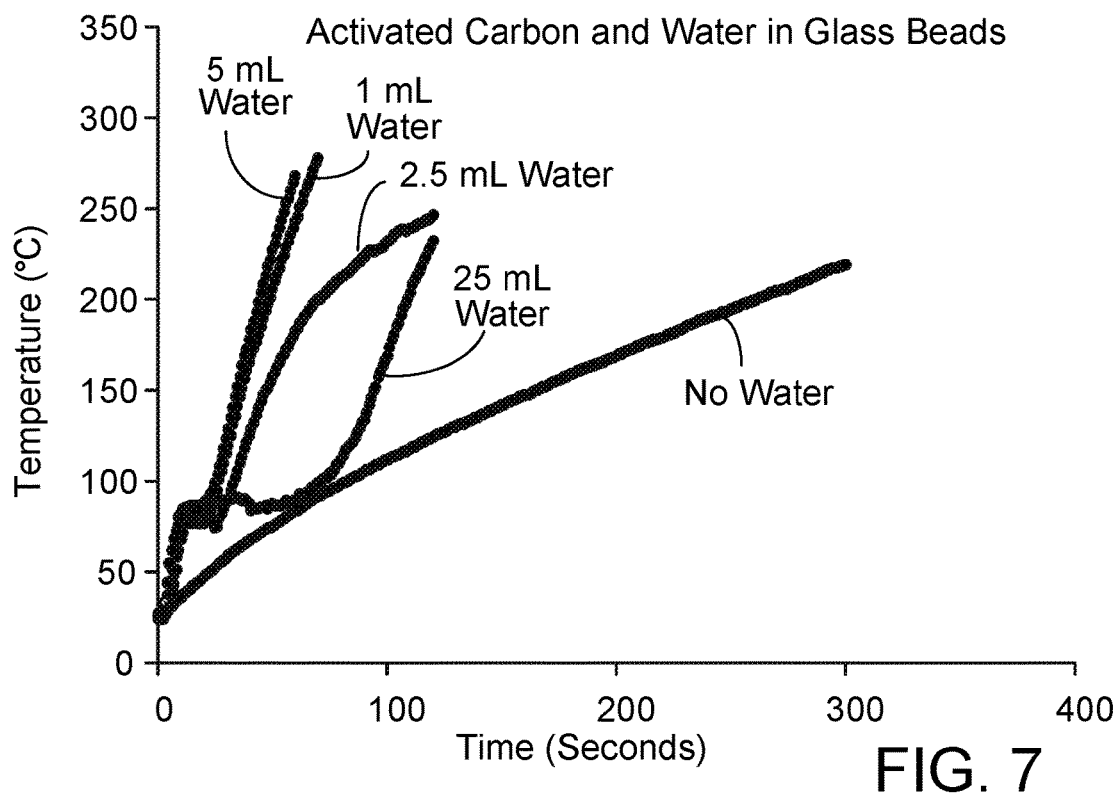
FIG. 7 shows the temperature response to microwave radiation of activated carbon and varying amounts of water in glass beads.
Figure 8:
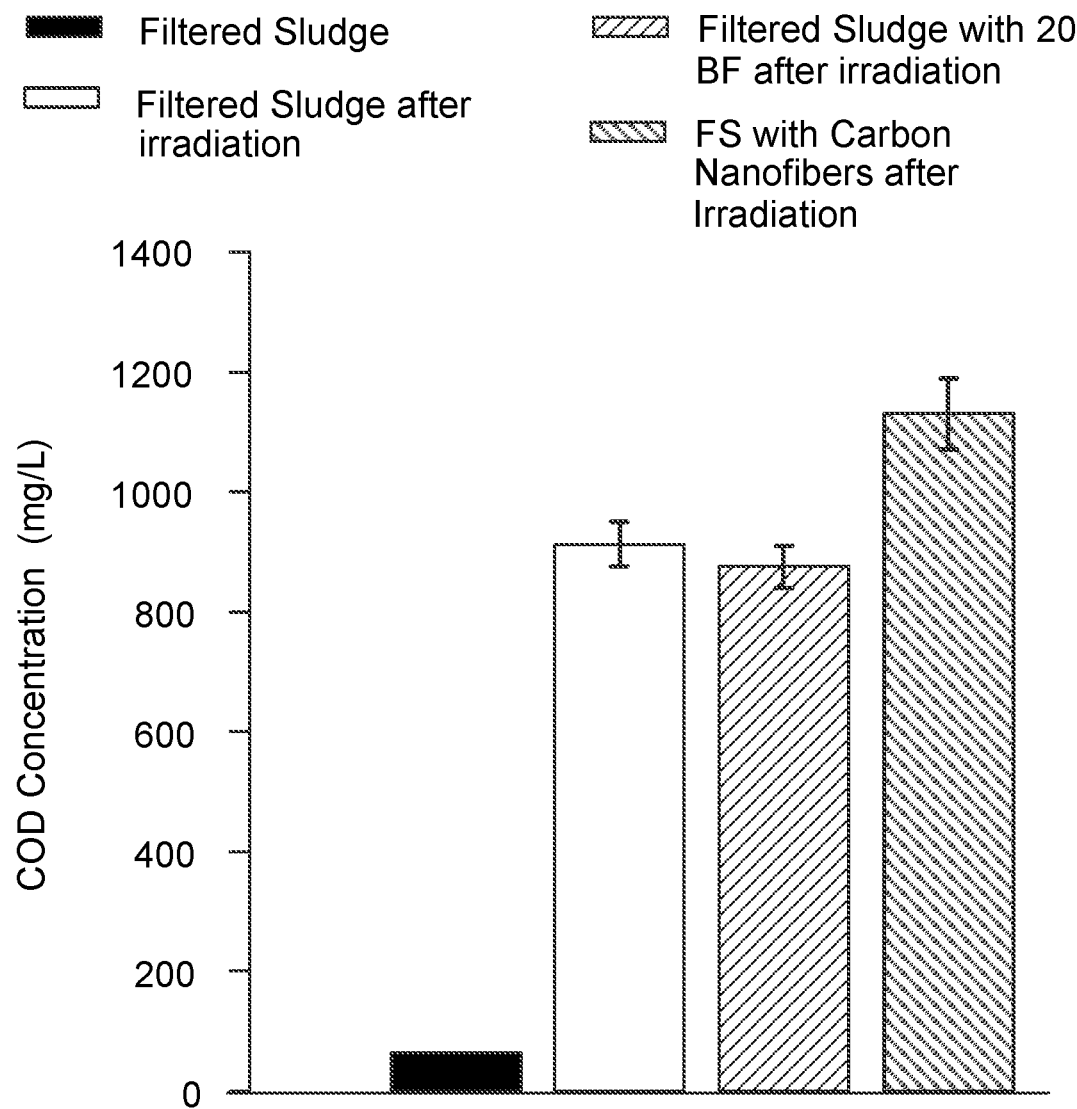
FIG. 8 shows the amounts of soluble chemical oxygen demand of sludge with and without additives and microwave treatment.

Select additives were tested in liquid suspension. As shown in FIG. 7, preliminary experiments in water indicated that all samples with water reached the boiling point after approximately the same microwave irradiation time with similar heating rates. This was attributed to the heat capacity ($C_W$) of water (i.e., water consuming the microwave energy input). Therefore, the additives were tested on waste activated sludge, which is the relevant matrix for testing the performance of the additives and allows additives to attach to inherent suspended solid particles. FIG. 8 shows results for activated sludge combined with Norit 20BF and carbon nanofibers. The results indicate that the microwave treatment with carbon nanofibers was able to solubilize more chemical oxygen than microwave only or microwave with bulk activated carbon particles (Norit 20-BF).

A number of embodiments have been described. Nevertheless, it will be understood that various modifications may be made without departing from the spirit and scope of disclosure. Accordingly, other embodiments are within the scope of the following claims

What is claimed is:

1. A method of treating wastewater sludge, the method comprising:
    combining the sludge with a carbon-based dielectric additive comprising carbon to yield a modified sludge;
    irradiating the modified sludge with microwave radiation to yield a treated sludge; and
    providing the treated sludge to an anaerobic digester.

2. The method of claim 1, wherein the carbon-based dielectric additive is an inorganic material.

3. The method of claim 1, wherein the carbon-based dielectric additive comprises an allotrope of carbon.

4. The method of claim 1, wherein the carbon-based dielectric additive is a nanomaterial.

5. The method of claim 4, wherein the nanomaterial is in the form of nanoparticles, nanorods, nanosheets, or nanotubes.

6. The method of claim 4, wherein the nanomaterial comprises carbon fibers.

7. The method of claim 4, wherein the nanomaterial comprises multi-walled carbon nanotubes.

8. The method of claim 1, wherein the sludge is generated from treatment of wastewater with biological methods.

9. The method of claim 1, wherein the modified sludge comprises 0.025 wt % to 2.5 wt % of the carbon-based dielectric additive.

10. The method of claim 1, wherein irradiating the modified sludge occurs for a duration in a range of 1 second to 15 minutes.

11. The method of claim 10, wherein irradiating the modified sludge occurs for a duration in a range of 1 second to 100 seconds.

12. The method of claim 1, wherein a frequency of the microwave radiation is between 300 MHz and 300 GHz.

13. The method of claim 12, wherein a frequency of the microwave radiation is between 2 GHz and 3 GHz.

14. The method of claim 13, wherein the frequency of the microwave radiation is 2.45 GHz.

15. The method of claim 1, wherein a power of the microwave radiation is between 500 W and 3000 W.

16. The method of claim 1, wherein an energy input to the modified sludge is at least 2.5 kWh per kilogram of modified sludge.

17. A wastewater treatment system comprising:
    a wastewater treatment reservoir comprising sludge;
    a sludge treatment reservoir operatively coupled to a microwave radiation source and configured to receive sludge from the wastewater treatment reservoir; and
    an anaerobic digester configured to receive treated sludge from the sludge treatment reservoir.

18. The wastewater treatment system of claim 17, wherein the sludge treatment reservoir is operatively coupled to a device configured to mechanically mix contents of the sludge treatment reservoir.

19. The wastewater treatment system of claim 17, wherein the sludge treatment reservoir is configured to receive a quantity of carbon nanomaterial.

20. The wastewater treatment system of claim 17, wherein the anaerobic digester is configured to generate biogas.

* * * * *